(12) United States Patent
Li et al.

(10) Patent No.: US 11,922,287 B2
(45) Date of Patent: Mar. 5, 2024

(54) VIDEO RECOMMENDATION WITH MULTI-GATE MIXTURE OF EXPERTS SOFT ACTOR CRITIC

(71) Applicants: Baidu USA, LLC, Sunnyvale, CA (US); Baidu.com Times Technology (Beijing) Co., Ltd., Beijing (CN)

(72) Inventors: Dingcheng Li, Sammamish, WA (US); Xu Li, Beijing (CN); Jun Wang, Beijing (CN); Ping Li, Bellevue, WA (US)

(73) Assignees: Baidu USA, LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 836 days.

(21) Appl. No.: 17/040,039

(22) PCT Filed: Jul. 15, 2020

(86) PCT No.: PCT/CN2020/102146
§ 371 (c)(1),
(2) Date: Sep. 21, 2020

(87) PCT Pub. No.: WO2022/011603
PCT Pub. Date: Jan. 20, 2022

(65) Prior Publication Data
US 2022/0019878 A1    Jan. 20, 2022

(51) Int. Cl.
*G06N 3/04* (2023.01)
*G06N 3/042* (2023.01)
(Continued)

(52) U.S. Cl.
CPC .............. *G06N 3/042* (2023.01); *G06N 3/08* (2013.01); *H04N 21/251* (2013.01)

(58) Field of Classification Search
None
See application file for complete search history.

(56) References Cited

U.S. PATENT DOCUMENTS 8,190,537 B1 * 5/2012 Singh .................... G06N 20/00
706/12
8,600,920 B2 * 12/2013 Flynn ...................... G06N 7/02
706/45
(Continued)

FOREIGN PATENT DOCUMENTS

| CN | 111246256 A | 6/2020 |
|---|---|---|
| CN | 111310034 A | 6/2020 |
| WO | 2020113228 A | 6/2020 |

OTHER PUBLICATIONS

Beygelzimer et al., "The offset tree for learning with partial labels," arXiv preprint arXiv:0812.4044, 2016. (16pgs).
(Continued)

*Primary Examiner* — Maikhanh Nguyen
(74) *Attorney, Agent, or Firm* — NORTH WEBER & BAUGH LLP

(57) ABSTRACT

Described herein are embodiments of a reinforcement learning based large-scale multi-objective ranking system. Embodiments of the system may be used for optimizing short-video recommendation on a video sharing platform. Multiple competing ranking objective and implicit selection bias in user feedback are the main challenges in real-world platform. In order to address those challenges, multi-gate mixture of experts (MMoE) and soft actor critic (SAC) are integrated together into a MMoE_SAC system. Experiment results demonstrate that embodiments of the MMoE_SAC system may greatly reduce a loss function compared to systems only based on single strategies.

17 Claims, 6 Drawing Sheets

(51) Int. Cl.
    G06N 3/08      (2023.01)
    H04N 21/25     (2011.01)

(56) References Cited

U.S. PATENT DOCUMENTS

| 10,515,116 | B2* | 12/2019 | Zheng | G06F 16/7867 |
|---|---|---|---|---|
| 2012/0096488 | A1* | 4/2012 | Wei | H04N 21/47202 |
| | | | | 725/34 |
| 2015/0012378 | A1* | 1/2015 | Herbrich | G06Q 30/0633 |
| | | | | 705/26.7 |
| 2017/0228385 | A1 | 8/2017 | Zheng et al. | |
| 2020/0327450 | A1* | 10/2020 | Huang | G06N 3/08 |
| 2022/0027359 | A1* | 1/2022 | Wood | G06N 20/00 |

OTHER PUBLICATIONS

Covington et al., "Deep neural networks for youtube recommendations," In Proceedings of the 10th ACM conference on recommender systems, 191-198, 2016. (8pgs).

Derman et al., "Soft-Robust Actor-Critic Policy-Gradient," arXiv preprint arXiv:1803.04848, 2018. (17pgs).

Duan et al., Benchmarking deep reinforcement learning for continuous control, arXiv preprint arXiv:1604.06778, 2016. (14pgs).

Fujimoto et al., "Addressing Function Approximation Error in Actor-Critic Methods," arXiv preprint arXiv:1802.09477, 2018. (15pgs).

Haarnoja et al., "Soft Actor-Critic: Off-Policy Maximum Entropy Deep Reinforcement Learning with a Stochastic Actor," arXiv preprint arXiv:1801.01290, 2018. (14pgs).

Horvitz et al., "A generalization of sampling without replacement from a finite universe," Journal of the American statistical Association 47, 260, 663-685, 1952. (24pgs).

Ie et al., "Reinforcement learning for slate-based recommender systems: A tractable decomposition and practical methodology," arXiv preprint arXiv:1905.12767, 2019. (38pgs).

Jiang et al., "Doubly Robust Off-policy Value Evaluation for Reinforcement Learning," arXiv preprint arXiv:1511.03722, 2016. (14pgs).

Lillicrap et al., "Continuous control with deep reinforcement learning," arXiv preprint arXiv:1509.02971, 2019. (14pgs).

Ma et al., "Modeling task relationships in multi-task learning with multi-gate mixture-ofexperts," In Proc. of 24th ACM SIGKDD Intr. Conf. on Knowledge Discovery & Data Mining, 2018.(10pgs).

Silver et al., "Deterministic Policy Gradient Algorithms," In Proc. of the 31th Intr. Conf. on Machine Learning (ICML) 2014. (9pgs).

Zhao et al., "Recommending what video to watch next: a multitask ranking system," In Proc. of the 13th ACM Conf. on Recommender Systems, 2019. (9pgs).

Zou et al., "Pseudo Dyna-Q: A Reinforcement Learning Framework for Interactive Recommendation," In the 13th ACM Intr. Con. on Web Search & Data Mining, 2020. (9pgs).

International Search Report dated Apr. 19, 2021, in International Patent Application No. PCT/CN2020/102146, filed Jul. 15, 2020. (4pgs).

Written Opinion of the International Searching Authority dated Apr. 19, 2021, in International Patent Application No. PCT/CN2020/102146, filed Jul. 15, 2020. (4 pgs).

Hook et al., "Deep Multi-Critic Network for accelerating Policy Learning in multi-agent environments," Neural Networks, 2020. (27pgs).

\* cited by examiner

VIDEO RECOMMENDATION WITH MULTI-GATE MIXTURE OF EXPERTS SOFT ACTOR CRITIC

CROSS-REFERENCE TO RELATED APPLICATIONS

This patent application is filed pursuant to 35 USC § 371 as a US National Phase Application of International Patent Application No. PCT/CN2020/102146, filed on 15 Jul. 2020, entitled "VIDEO RECOMMENDATION WITH MULTI-GATE MIXTURE OF EXPERTS SOFT ACTOR CRITIC," listing Dingcheng Li, Xu Li, Jun Wang, and Ping Li as inventors, which patent document is incorporated by reference herein in its entirety and for all purposes.

A. Technical Field

The present disclosure relates generally to systems and methods for computer learning that can provide improved computer performance, features, and uses. More particularly, the present disclosure relates to systems and methods of computer learning for video recommendation.

B. Background

Deep neural networks have achieved great successes in many domains, such as computer vision, natural language processing, recommender systems, etc.

With the rise of short-video application, diverse short-video recommendation systems have been constructed to increase user involvement. Usually, typical recommendation systems involve a two-stage design with a candidate generation and a ranking. Among the two stages, a good ranking strategy is directly related to the user behavior and thus play an essential role in keeping users watching videos. The ranking strategy firstly attempts to attract users to click a short video and then, after finishing watching it, secondly, attract them to click those recommended to them. In this stage, the recommender has multiple candidates retrieved via candidate generation and applies a large-capacity model to rank. Finally, it recommends the user to the top one or few videos to select. Two main challenges exist in a recommendation system. Firstly, the objectives to be optimized are often different and even may be conflicting because users are so diverse in their preferences. Secondly, the system, more often than not, has implicit selection bias. For example, a user might have clicked and watched a video simply because it was being ranked high rather than he really likes it. How to effectively and efficiently address these problems is a key for a successful recommender system.

Accordingly, what is needed are systems and methods of computer learning for video recommendation.

SUMMARY

Embodiments of the present disclosure provide a computer-implemented method for multi-objective ranking, a system for multi-objective ranking, and a non-transitory computer-readable medium or media.

According to a first aspect, some embodiments of the present disclosure provide a computer-implemented method for multi-objective ranking, the method comprises: receiving, at a multi-gate mixture of experts (MMoE) layer comprising multiple experts and a gating network, hidden embeddings corresponding to one or more states and one or more actions; generating, by each of multiple experts using soft actor critic (SAC), a prediction based on the hidden embeddings, each prediction comprises one or more prediction parameters corresponding to one or more actions respectively; obtaining a weighted sum for predictions by the multiple experts, in accordance of a weight generated by the gating network for each expert; and generating an MMoE layout output, from the MMoE layer, based on the weighted sum.

According to a second aspect, some embodiments of the present disclosure provide a system for multi-objective ranking, the system includes: one or more processors; and a non-transitory computer-readable medium or media comprising one or more sets of instructions which, when executed by at least one of the one or more processors, causes steps to be performed comprising: converting features from one or more data sources into hidden embeddings; receiving, at a multi-gate mixture of experts (MMoE) layer comprising multiple experts and a gating network, the hidden embeddings; generating, by each of multiple experts using soft actor critic (SAC), a prediction based on the input, each prediction comprises one or more prediction parameters corresponding to one or more actions respectively; obtaining a weighted sum for predictions by the multiple experts, in accordance of a weight generated by the gating network for each expert; and generating an MMoE layout output, from the MMoE layer, based on the weighted sum.

According to a third aspect, some embodiments of the present disclosure provide a non-transitory computer-readable medium or media comprising one or more sequences of instructions which, when executed by at least one processor, causes steps for multi-objective ranking comprising: converting features from one or more data sources into hidden embeddings; receiving, at a multi-gate mixture of experts (MMoE) layer comprising multiple experts and a gating network, the hidden embeddings; generating, by each of multiple experts using soft actor critic (SAC), a prediction based on the input, each prediction comprises one or more prediction parameters corresponding to one or more actions respectively; obtaining a weighted sum for predictions by the multiple experts, in accordance of a weight generated by the gating network for each expert; and generating an MMoE layout output, from the MMoE layer, based on the weighted sum.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
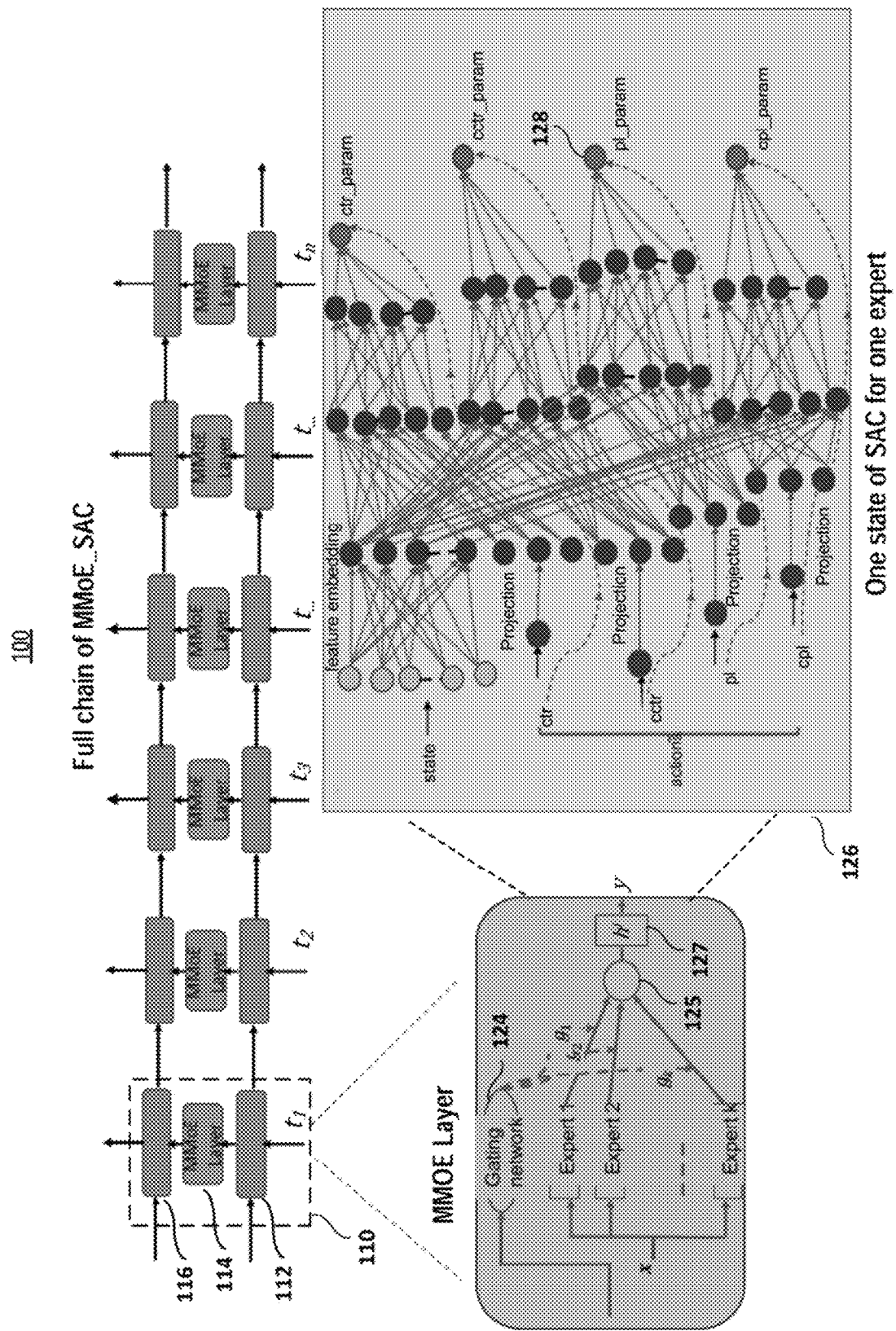
FIG. 1 depicts a framework, based on soft actor critic with the multiple actions learned with multi-gate mixture of experts, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of video recommendation, aspects of the present disclosure are not so limited. Accordingly, the aspects of the present disclosure may be applied or adapted for use in other contexts, including but not limited to audio recommendation, multimedia recommendations, etc.

A. General Introduction

With the rise of short-video applications, diverse short-video recommendation systems have been constructed to increase user involvement. Usually, typical recommendation systems involve a two-stage design with a candidate generation and a ranking. Among the two stages, a good ranking strategy is directly related to user behavior and thus plays an essential role in keeping users watching videos. The ranking strategy firstly attempts to attract users to click a short video and then, after a user finishes watching it, attracts them to click recommended videos to continue. In the ranking stage, a recommender has multiple candidates retrieved via candidate generation and applies a large-capacity model to rank. Finally, it recommends the user to the top one or few videos to select. Two main challenges exist in a recommendation system. Firstly, the objectives to be optimized are often different and may even be conflicting because users are so diverse in their preferences. Secondly, the system, more often than not, has implicit selection bias. For example, a user might have clicked and watched a video simply because it was being ranked high rather than he really likes it. How to effectively and efficiently address these problems is a key for a successful recommender system. Essentially, multiple ranking objectives may be modeled with multi-task learning. Some explored a variety of soft-parameter sharing techniques, including multi-gate mixture-of-experts (MMoE) to optimize the ranking objectives. Multiple objectives were first grouped into two categories, engagement objectives and satisfaction objectives. MMoE was then employed to automatically learn parameters to share across potentially conflicting objectives. In addition, a shallow tower was added to reduce the selection bias. This architecture factorized the label in the training data into unbiased user utility and the estimated propensity score. Experiments confirm that this framework brings improvements to the full recommendation system.

Nonetheless, this approach focuses on estimating immediate user engagement without considering the long-term effects of recommendations on user behavior. Reinforcement learning (RL) methods offer the potential to optimize recommendations for long-term user engagement. User click and watch behaviors are parameterized as rewards and recommendations as actions. However, since users are often presented with slates of multiple items—which may have interacting effects on user choice—methods are required to deal with the combinatorics of the RL action space. Some proposed to slate-based deep Q-learning to address the challenge in optimizing long-term value using RL.

However, Q-learning has its limitations in handling large scale of continuous domains. Therefore, Deep Deterministic Policy Gradient (DDPG) is extended to make up the shortcomings of deep Q-learning. By adding parameterized policy gradients, DDPG expands deep Q-learning to a compound network of actor (policy network) and critic (value network). It brings improvements compared with deep Q-learning. However, DDPG learns a deterministic policy, which constrains explorations of DDPG.

In contrast, soft actor critic (SAC) as an off-policy maximum entropy actor-critic algorithm provides both sample-efficient learning and stability. More remarkably, it extends to very complex, high-dimensional tasks, such as the Humannoid benchmark with 21 action dimensions. Different from the usual RL framework, which maximizes the expected sum of rewards, SAC introduces a more general maximum entropy objective by adding expected entropy of a policy over state marginals of the trajectory distribution induced by the policy. This design incentivizes the policy to explore more widely and to capture multiple modes of near optimal behavior.

Although SAC already does well in modeling complex high dimensional tasks, multiple competing ranking objectives and implicit selection bias still compose big challenges in certain tasks. In a speculation that MMoE may greatly increase the limit that SAC can handle when MMoE and SAC are embedded in a reasonable architecture, the present disclosure proposes embodiments to construct a user recommendation (e.g., video recommendation) framework based on SAC with the multiple actions learned with multi-gate mixture of experts, short as MMoE_SAC. In one or more experiments, it is found that more efficient learning curve may be formed and meanwhile performances keep improving as well.

B. Embodiments of Multi-Gate Mixture of Experts Soft Actor Critic

FIG. 1 depicts a MMoE_SAC framework for user recommendation, according to one or more embodiments of this present disclosure. One or more embodiments of the MMoE_SAC framework may be applied for video recommendation.

As shown in FIG. 1, the MMoE_SAC framework forms a chain from state $t_1$ to $t_n$. Each state 110 may comprise a deep neural net, the middle of which is a MMoE layer 114 between an input layer 112 and an output layer 116. In one or more embodiments, the MMoE layer 114 comprises a plurality of experts 126 and a gating network 124. The experts and the gating network interactive each other through k gates and finally yield an MMoE layer output y, which represents one or more weights learned for one or more actions. In one or more embodiments, the one or more actions comprise click-through rates (ctr), play length (pl), continuous ctr (cctr), continuous play length (cpl), as shown in the example of FIG. 1. In one or more embodiments, each of the plurality of experts itself is a neural network using SAC methodology. In one or more embodiments, the input layer 112 or the output layer 116 may be a recurrent neural network (RNN) layer, a convolutional neural network (CNN) layer, or a Long short-term memory (LSTM) layer.

1. Embodiments of MMoE Network

Figure 2:
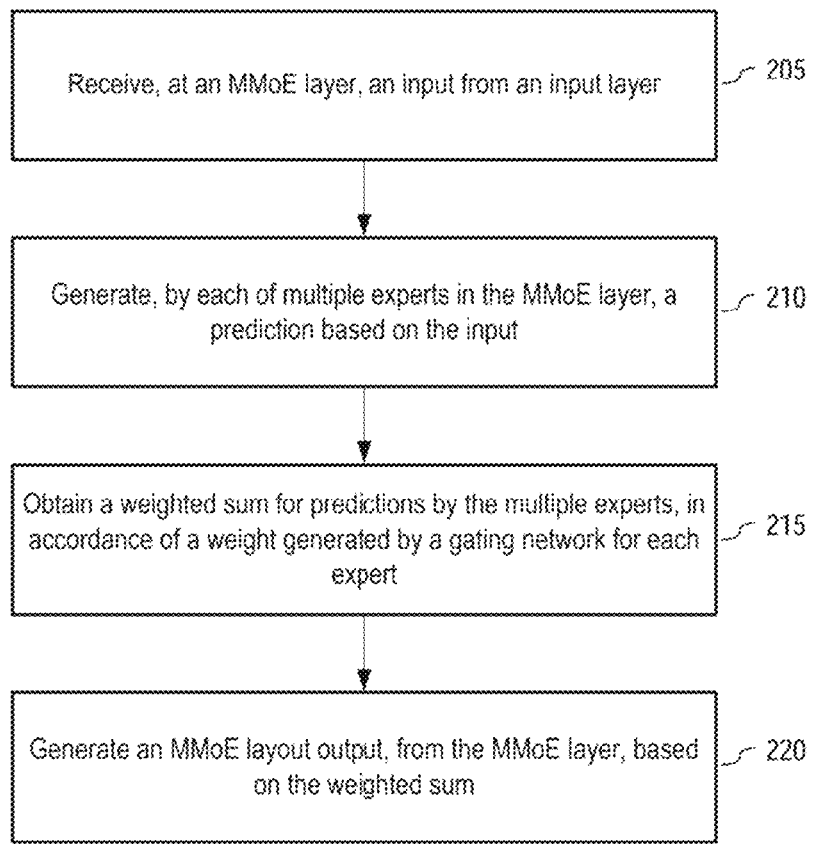
FIG. 2 depicts a process for implementation of multi-gate mixture-of-experts (MMoE) network, according to embodiments of the present disclosure.

In one or more embodiments, implementation of MMoE network follows multi-layer perceptions with ReLU activation. FIG. 2 depicts a process for MMoE implementation, according to one or more embodiments of the present disclosure.

For a given state (e.g., state at time step $t_1$ as shown in FIG. 1), the MMoE layer receives (205) an input from the input layer 112. In one or more embodiments, the input comprises one or more feature embedding.

Given M tasks and K experts, each expert 126 generates (210) a prediction $f_k^i(x)$. Given the prediction 128 from each expert, a weighted sum 125 $f^i(x) = \Sigma_{k=1}^{K} g_k^i(x) f_k^i(x)$ for predications by the K experts is obtained (215) in accordance of a weight $g_k^i(x)$ generated by the gating network for each expert. Using the last hidden layer $h_k^i$ 127, an MMoE layer output $y^i$ may be generated (220) based on the weighted sum using the following equation, $$y^i = h^i(f^i(x)) \quad (1)$$

where i is action number, k is expert number, and $x \in R^d$ is a lower-level shared hidden embedding. In one or more embodiments, x may be randomized sampled embedding assigned to the K experts for training. In one or more embodiments, x may comprise state embedding and action embedding.

Figure 3:
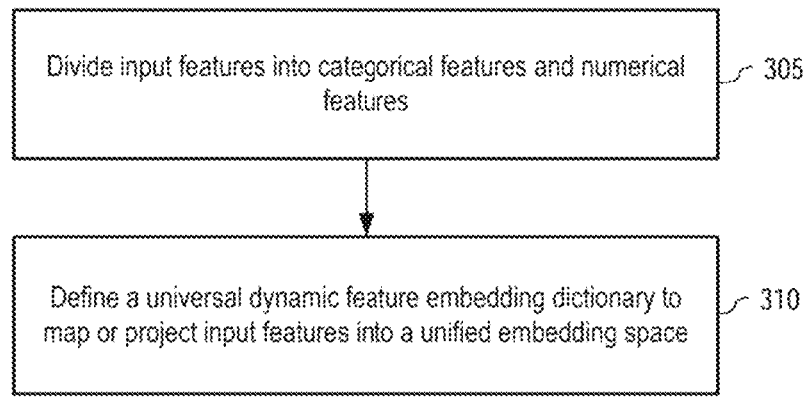
FIG. 3 depicts a process for generating feature embedding, according to embodiments of the present disclosure.

FIG. 3 depicts a process for generating feature embedding, according to embodiments of the present disclosure. In one or more embodiments, certain features may involve diverse data sources, such as user profiles, video ID and log data. The input features are firstly divided (305) into categorical features and numerical features. Afterwards, a universal dynamic feature embedding dictionary is defined to map or project (310) the categorical features and numerical features into a unified embedding space. In one or more embodiments, during mapping or projecting the input features, each embedding lookup for categorical features firstly uses a one-hot or multi-hot vector $e_i$ (e.g., with the ith position being 1 while others are 0, where i corresponds to ith category). Secondly, a row vector of the embedding is obtained with $w_i^T = e_i^T W$, where W is a transformation weight matrix $W \in \mathcal{R}^{m \times d}$. This way, categorical features may be transformed from sparse features to dense features.

In one or more embodiments, the gating network outputs $g^k$ for expert k, where $g_k^i(x) \in R^n$, $g_k^i(x)$ is the kth entry and $f_k^i(x)$ is the prediction of the kth expert for task i. In one or more embodiments, the gating network applies a linear transformation of the input with a softmax layer:

$$g_k^i(x) = \text{softmax}(W_{g_k^i} a) \quad (2)$$

where $$W_{g_k^i} \in R^{K \times D}$$

are weights for the linear transformation, a is projected action $f_k^i(x)$ from the expert. In one or more embodiments, the weights $W_{g_k^i}$ may be trainable during a training process. In the embodiment shown in FIG. 1, the output from an expert comprises one or more prediction parameters, e.g., ctr_param, cctr_param, pl_param, and cpl_param for the actions ctr, cctr, pl, and cpl respectively.

2. Embodiments of SAC for Action Prediction

In one or more embodiments, the function $f^i(x)$ deployed by each expert for prediction uses SAC methodology. In one or more embodiments, each expert is a deep neural network (DNN) incorporating SAC algorithm, as shown in the box 126 in FIG. 1.

As shown in the block 126 for one expert in a state, they are inputs, hidden layers and outputs of the DNN. In one or more embodiments, inputs to the DNN may comprise embeddings corresponding to states $s_t$ and actions $a_t$. Feature corresponding to the states are used as input for each expert, while embeddings corresponding to the actions may be used for labels for training. In one or more embodiments, the action values of the labels are used to calculate losses during training.

Figure 4:
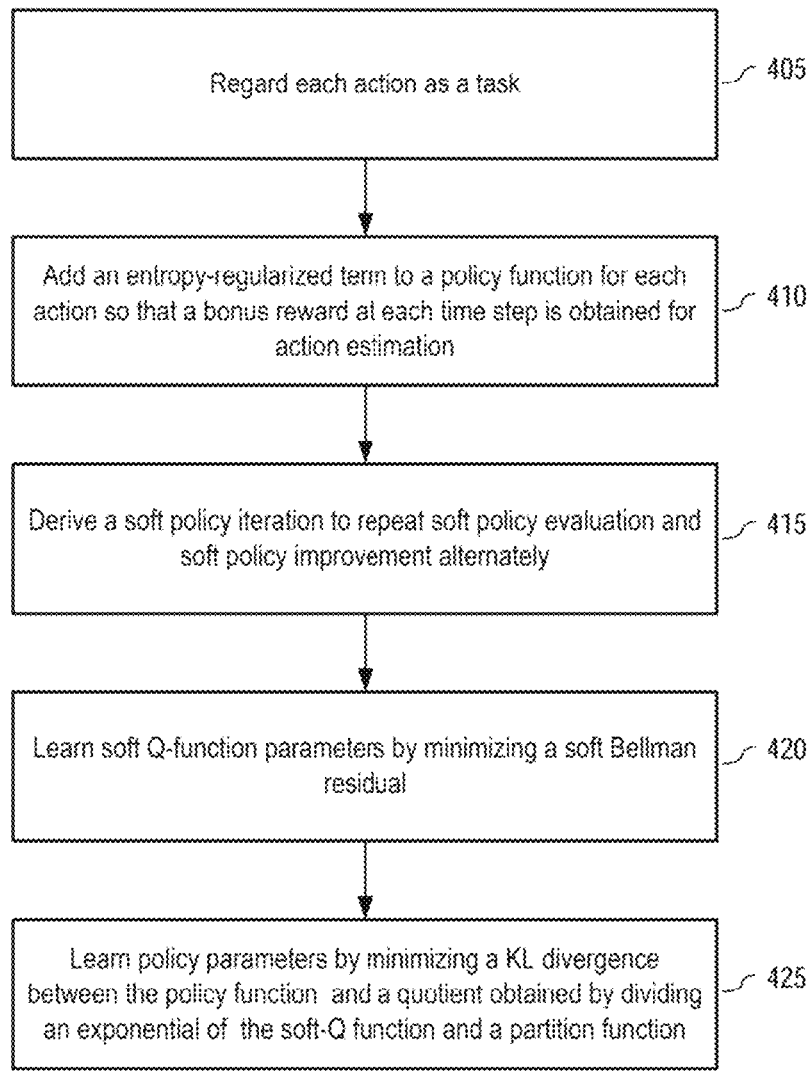
FIG. 4 depicts a soft actor critic (SAC) process for action prediction, according to embodiments of the present disclosure.

FIG. 4 depicts a SAC process for action prediction, according to embodiments of the present disclosure. In one or more embodiments, each action (e.g., each of the four actions ctr, cctr, pl, and cpl) is regarded (405) a task for an expert. In one or more embodiments, during training for the expert, although the four actions are related to each other, the loss calculation for each action is made independently. The feature embedding may be shared across the actions to control the interactions between actions.

One point in the present framework is to predict the actions. In one or more embodiments, actions comprise actions in multiple categories, such as ctr, cctr, pl and cpl corresponding to the four weights mentioned above. These categories form a mixture of discrete and continuous action spaces. In one or more embodiments, continuous values are assigned to all actions since SAC works better in a continuous domain.

In one or more embodiments, an entropy-regularized term is added (410) by a weight of α to a reward term for a policy function for each action so that an entropy bonus reward at each time step is obtained for action estimation as following, $$\pi* = \operatorname*{argmax}_{\pi} E_{\tau \sim \pi} \left[ \sum_{t=0}^{\infty} \gamma^t (r(s_t, a_t, s_{t+1}) + \alpha \mathcal{H}(\pi(\cdot | s_t))) \right] \quad (3)$$

Where the reward term $r(s_t, a_t, s_{t+1}) = p_\pi(a_t, s_t)Q^\pi(s_t, a_t)$, $p_\pi$ is a probability function, $Q^\pi$ is a soft Q-function with input of $s_t$ and $a_t$. $\mathcal{H}(\pi \cdot | s_t)) = E_{s_{t+1} \sim P} V(s_{t+1})$ is the entropy-regularized term added to the policy function $\pi*$. In one or more embodiments, the probability function is used to make categorical state (or non-continuous state) soft. The entropy term comprises a value function $V(s_{t+i})$, which is used for calculating action values in a next time step.

In one or more embodiments, to learn the optimal maximum entropy policy with convergence guarantee, soft policy iteration is derived (415) to repeat soft policy evaluation and soft policy improvement alternately. In one or more embodiments, the value function (3) for next time step (t+1) is updated to include the entropy bonus rewards from current time step (t):

$$V^\pi(s_{t+1}) = E_{\tau \sim \pi} \left[ \sum_{t=1}^{\infty} \gamma^t (r(s_t, a_t, s_{t+1}) + \alpha \mathcal{H}(\pi(\cdot | s_t))) | s_{t+1} \right] \quad (4)$$

Likewise, in one or more embodiments, $Q^\pi$ may be updated to:

$$Q^\pi(s, a) = E_{\tau \sim \pi} \left[ \sum_{t=0}^{\infty} \gamma^t (r(s_t, a_t, s_{t+1}) + \alpha \sum_{t=1}^{\infty} \gamma^t \mathcal{H}(\pi(\cdot | s_t))) | s_t, a_t \right] \quad (5)$$

In one or more embodiments, these two equations may be connected to form a Bellman equation as, $$Q^\pi(s, a) = E_{s_{t+1} \sim P, a_{t+1} \sim \pi} [(r(s_t, a_t, s_{t+1}) + \gamma(Q^\pi(s_{t+1}, a_{t+1})) + \alpha \mathcal{H}(\pi(\cdot | s_{t+1}))] \quad (6)$$

$$= E_{s_{t+1} \sim P} [(r(s_t, a_t, s_{t+1}) + \gamma V^\pi(s_{t+1}))]$$

where P is the density function of input features x.

Therefore, the soft Q-function parameters may be trained or learned (420) by minimizing a soft Bellman residual:

$$J_Q(\theta) = E_{s_t, a_t \sim D} \left[ \frac{1}{2} (Q_\theta)(s_t, a_t) - \left( r(s_t, a_t) + \gamma E_{s_{t+1} \sim P} [V_\theta(s_{t+1})] \right)^2 \right] \quad (7)$$

where $Q_\theta$ is a soft Q-function Q parameterized by θ.

In one or more embodiments, policy function parameters may be learned (425) by minimizing the following expected Kullback-Leibler (KL) divergence between the policy function $\pi_{t+1}(\cdot | s_t)$ and a quotient $$\left( \frac{\exp(Q(s_t, \cdot))}{\Phi(Q(s_t, \cdot))} \right)$$

obtained by dividing an exponential of the Soft-Q function and a partition function Φ:

$$J_\pi(\phi) = E_{s_{t+1} \sim D} \left[ D_{KL} \left( \pi_{t+1}(\cdot | s_t) \| \frac{\exp(Q(s_t, \cdot))}{\Phi(Q(s_t, \cdot))} \right) \right] \quad (8)$$

where $\Phi(Q(s_t, \cdot)) = \Sigma \pi_{t+1}(\cdot | s_t) \exp(Q(s_t, \cdot))$ denotes the partition function. In one or more embodiments, the soft actor network may be differentiated as deterministic policy gradient (DPG).

In one or more embodiments, to mitigate positive bias in the policy improvement step, multiple soft Q-functions, e.g., clipped Double-Q trick in Twin Delayed DDPG (TD3), are used and the minimum Q-value of the multiple Q-functions is taken for each policy improvement step during soft policy iteration.

In one or more embodiments of the present disclosure, with one or more changes of the policy update rule, SAC may be upgraded to handle either discrete action spaces or a mixture of discrete and continuous action space.

C. Experimental Results

This section describes how experiments of MMoE_SAC ranking system were conducted. In one or more experimental settings, implicit feedback provided by a short-video sharing platform was used to train ranking model embodiments and conduct offline and live experiments. As mentioned earlier, the platform provides multiple ways for users to interact with recommended videos. The log data, ctr, cctr, pl, and cpl were used as labels while likes or dismissals, user profiles and video contents were used as features.

It shall be noted that these experiments and results are provided by way of illustration and were performed under specific conditions using a specific embodiment or embodiments; accordingly, neither these experiments nor their results shall be used to limit the scope of the disclosure of the current patent document.

1. Evaluation Metrics

In one or more experiments, four evaluation metrics were employed. The first evaluation metric is simply the losses between Q-values estimated from state values of selected actions and target state values computed from diverse feature embeddings.

$$L_{t+1}(\theta_{t+1}) = E_{s_t,a_t,r_t,s_{t+1}}[(Q_{t+1}^{truth} - Q_{t+1}^{estimate})] \quad (9)$$

where $C_{t+1}^{truth}$ is in fact Equation (6) and the second term $Q_{t+1}^{estimate}$ is the second and the third term of Equation (7).

One or more experimented datasets were collected from online video watching logs. The logs comprise click-through rates (ctr), play length (pl), continuous CTR (cctr), continuous play length (cpl). In addition, the log data was organized with days and a slide window size of seven days was used. Model trained from last day was used to predict actions of current day. Then, the loss is defined as the differences between the actual actions of current day and the predicted actions.

The second evaluation metric is called direct method (DM), aiming at estimating the reward function from given data and uses this estimate in place of actual reward to evaluate the policy value on a set of context. Its estimation goes as:

$$\hat{V}_{DM}^{\pi} = \frac{1}{|D|} \sum_{s \in S} \hat{\varrho}_{\pi}(s) \quad (10)$$

where $\hat{\varrho}_{\pi}(s) = E_{(s,\vec{r}) \sim D}[r_a|s]$ and $|D|$ is the dataset size. A problem for this evaluation is that $\hat{\varrho}$ may be biased.

The third evaluation metric, named inverse propensity score (IPS), uses importance weighting to evaluate the proportions of correct for the incorrect in the historic data.

$$\hat{V}_{IPS}^{\pi} = \frac{1}{|D|} \sum_{(s,h,a,r_a) \in D} \frac{r_a I(\pi(s) = a)}{\hat{p}(a|s,h)} \quad (11)$$

It is less prone to bias. However, it has the problem of larger variance.

In one or more embodiments, considering those shortcomings of both approaches, a fourth evaluation metric, named doubly robust (DR) estimation, is included to get more comprehensive evaluations.

$$\hat{V}_{DR}^{\pi} = \frac{1}{|D|} \sum_{(s,h,a,r_a) \in D} \frac{r_a - \hat{\varphi}(s) I(\pi(s) = a)}{\hat{p}(a|s,h)} + \hat{\varphi}(s) \quad (11)$$

2. Embodiments of Losses and Action Prediction

Figure 5:
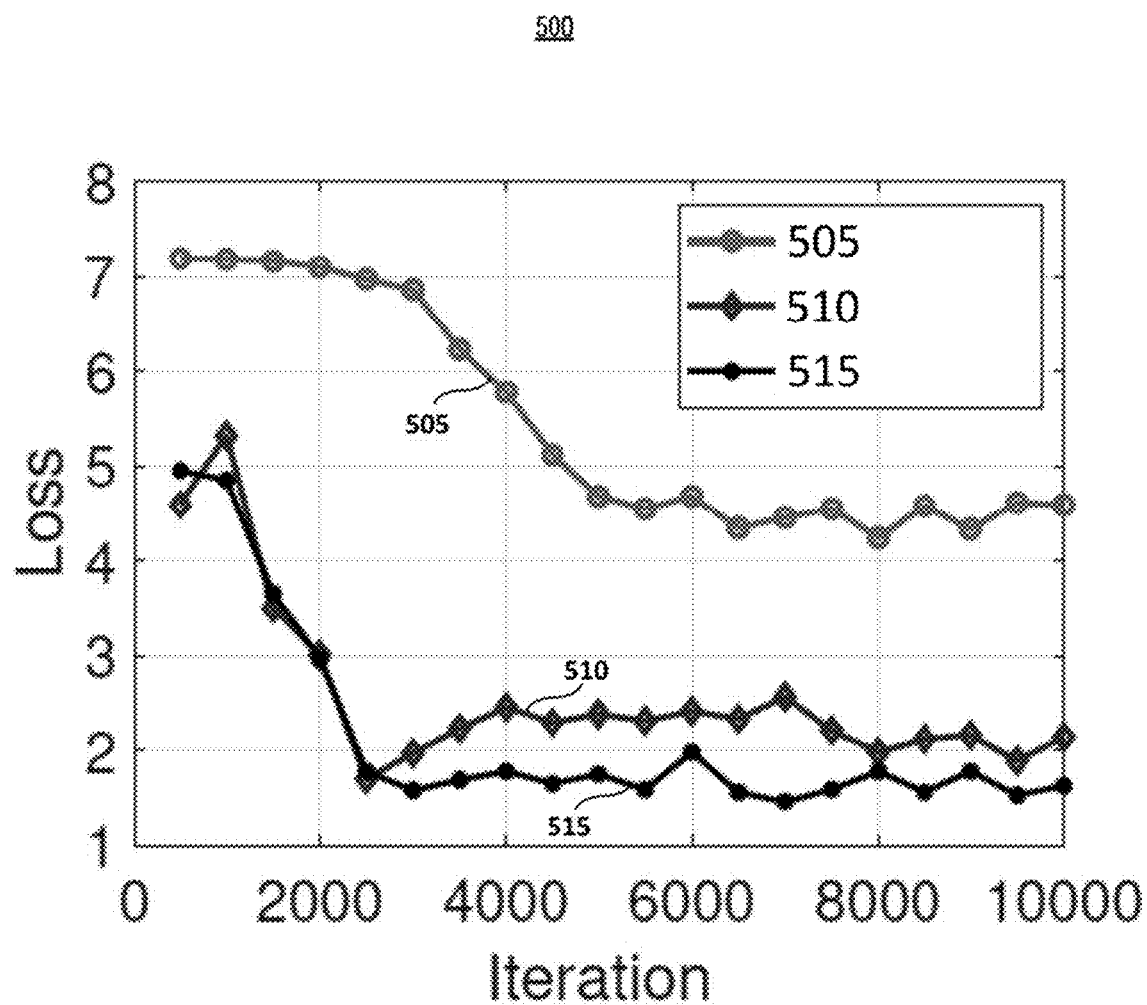
FIG. 5 graphically depicts loss for recommendation system based on deep Q leaning, SAC, and MMoE_SAC, according to embodiments of the present disclosure.

FIG. 5 lists losses for recommendation system based on deep Q-learning (referred as "deepQ") (505), SAC (510) and MMoE_SAC (515) respectively. All losses were calculated with Equation 9, namely, the expected loss between Q-values estimated from state values of selected actions and target state values. It is evident that both SAC and MMoE_SAC have a higher falling trend compared with deep Q-learning besides both of them have lower starting loss values as well. After about 5000 iterations, all of them three look converged to some minimum values. But deep Q-learning fluctuates around five while the other two fluctuate around two. Among SAC and MMoE_SAC, the latter has even lower losses. This seems to suggest that the mixture of expert strategy makes effects.

3. Model Accuracy Viewed from IPS, DM, and DR

In this section, one or more experimental results are reported. For comparison, results from deepQ and SAC are also listed. Besides losses, DM, IPS and DR, results for action predictions are also reported.

TABLE 1

Model Accuracy evaluated with IPS, DM and DR.

| Metrics | Actions | IPS | DM | DR |
|---|---|---|---|---|
| deepQ | 1 | 0.348 | 0.372 | 0.272 |
| | 2 | 0.038 | 0.433 | 0.419 |
| | 3 | 0.385 | 0.368 | 0.249 |
| | 4 | 0.084 | 0.391 | 0.374 |
| SAC | 1 | 0.219 | 0.407 | 0.222 |
| | 2 | 0.224 | 0.406 | 0.223 |
| | 3 | 0.230 | 0.407 | 0.218 |
| | 4 | 0.002 | 0.407 | 0.405 |
| MMoE_SAC | 1 | 0.224 | 0.378 | 0.226 |
| | 2 | 0.232 | 0.377 | 0.226 |
| | 3 | 0.234 | 0.378 | 0.226 |
| | 4 | 0.001 | 0.377 | 0.377 |

Table 1 lists model accuracy values evaluated with IPS, DM, and DR for deepQ, SAC, and MMoE_SAC models. Values reported in Table 1 are the mean of all 10000 steps. In general, the scores reflect how accurate the model makes predictions on the actions. As long as these scores are within a reasonable range for all four actions, the model may be considered to have a good performance. For comparisons among the models, a smaller score implies a more stable performance. In one or more settings, the experiments were run more than 10,000 steps and all three metrics were evaluated at each step. Then, the means of them were taken for each action. A few trends may be observed from these results. Firstly, most of results of DR for three models are lower than DM. Compared to IPS, some of DR and DM results are higher while some of them are lower. As discussed above, IPS has larger variances. In addition, it may be seem that DM scores of both SAC and MMoE_SAC are quite similar to each other though those of SAC are high for all four actions. In contrast, DM scores for deepQ are quite different between each other.

D. Some Conclusions

In present disclosure, embodiments based on MMoE_SAC are presented for short-video recommendation. In one or more embodiments, soft actor critic is used to do recommendation works for combination with MMoE. MMoE_SAC may make full use of the advantages of mixture of experts and entropy-based offline policy algorithm. It enables the recommender to handle large volumes of continuous actions and also encourages embodiments of the MMoE_SAC model to explore larger spaces to discover more relevant videos for users. MMoE_SAC performs well in utilizing the historical logs to generate useful features from sparse, high dimensional feature spaces. Experiments demonstrate that MMoE_SAC performs better than a deepQ-based system and a single SAC-based system, with the MMoE_SAC converges to the lowest loss. One or more embodiments of MMoE_SAC may further be extended to handle the combination of categorical and continuous actions efficiently.

E. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 6:
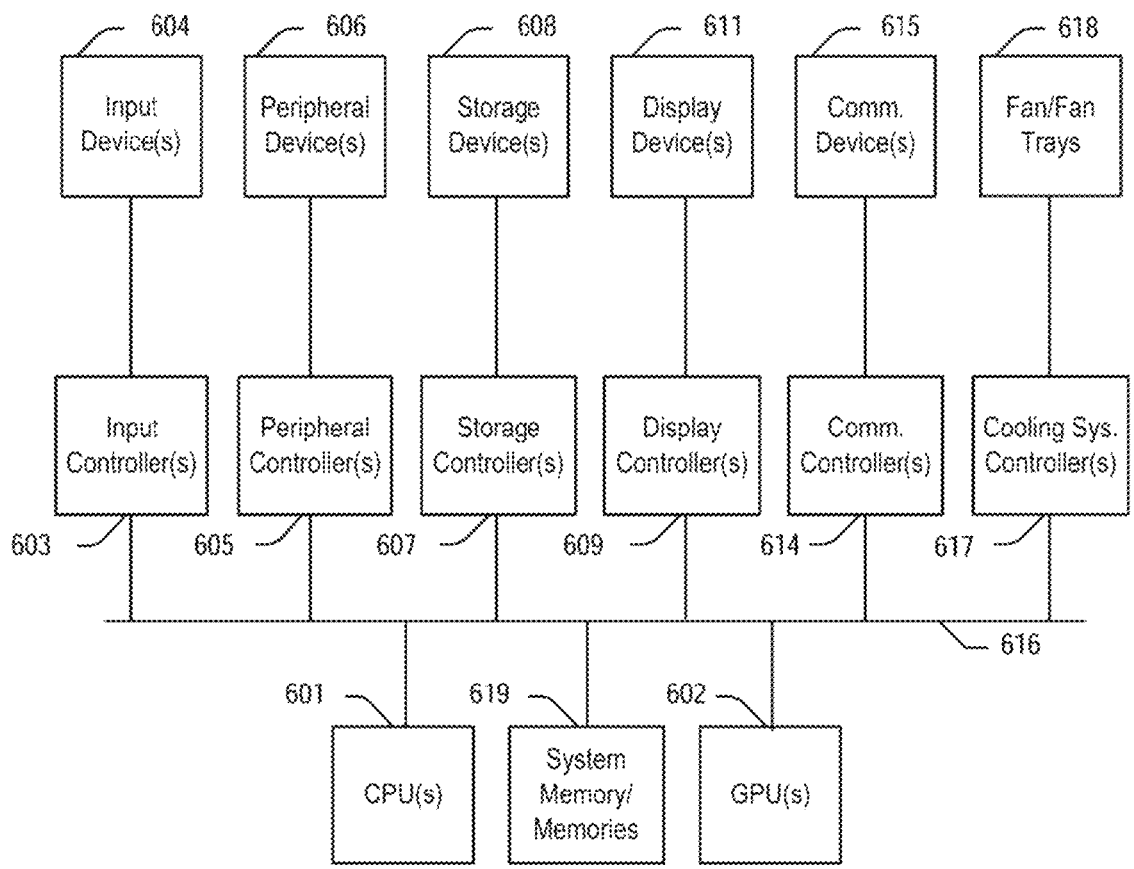
FIG. 6 depicts a simplified block diagram of a computing device/information handling system, according to embodiments of the present disclosure.

FIG. 6 depicts a simplified block diagram of an information handling system (or computing system), according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 602 and/or a floating-point coprocessor for mathematical computations. In one or more embodiments, one or more GPUs 602 may be incorporated within the display controller 609, such as part of a graphics card or cards. The system 600 may also include a system memory 619, which may comprise RAM, ROM, or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT) display, a thin film transistor (TFT) display, organic light-emitting diode, electroluminescent panel, plasma panel, or any other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 600 comprises one or more fans or fan trays 618 and a cooling subsystem controller or controllers 617 that monitors thermal temperature(s) of the system 600 (or components thereof) and operates the fans/fan trays 618 to help regulate the temperature.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means"

terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for multi-objective ranking comprising:
    receiving, at a multi-gate mixture of experts (MMoE) layer comprising multiple experts and a gating network, embeddings corresponding to one or more states and one or more actions, wherein each expert is a deep neural network (DNN);
    generating, by each of multiple experts using soft actor critic (SAC), an expert output based on the embeddings, each expert output related to one or more prediction parameters corresponding to one or more actions;
    obtaining a weighted sum of the expert outputs by the multiple experts, in accordance with weights generated by the gating network for the experts, in which each expert has a corresponding weight obtained from the gating network; and
    generating a prediction output based on the weighted sum, wherein a training process comprises:
        regarding each action as a task;
        adding an entropy-regularized term to a policy function; and
        learning policy parameters by minimizing a Kullback-Leibler divergence between the policy function and a quotient obtained by dividing an exponential of a soft-Q function and a partition function.

2. The computer-implemented method of claim 1 wherein the embeddings are generated by steps of:
    dividing a plurality of features for the one or more states and the one or more actions into categorical features and numerical features; and
    defining a universal dynamic feature embedding dictionary to map or project the plurality of features into a unified embedding space for the embedding.

3. The computer-implemented method of claim 2 wherein defining a universal dynamic feature embedding dictionary to map or project the plurality of features into a unified embedding space comprising:
    using a one-hot or multi-hot vector for each embedding lookup for categorical features; and
    transforming, using a transformation weight matrix, the categorical features from sparse features to dense features.

4. The computer-implemented method of claim 1 wherein loss calculation for each of the one of more actions is independent from each other during a training process.

5. The computer-implemented method of claim 1 wherein the training process further comprises steps of:
    implementing a soft policy iteration by repeating soft policy evaluation and soft policy improvement alternately; and
    training soft-Q function parameters by minimizing a soft Bellman residual.

6. The computer-implemented method of claim 5 wherein during the soft policy iteration, a soft Q-function with a minimum Q-value among multiple soft Q-functions is taken for each policy improvement step.

7. A system for multi-objective ranking comprising:
    one or more processors; and
    a non-transitory computer-readable medium or media comprising one or more sets of instructions which, when executed by at least one of the one or more processors, causes steps to be performed comprising:
        converting features from one or more data sources into embeddings;
        receiving, at a multi-gate mixture of experts (MMoE) layer comprising multiple experts and a gating network, the embeddings corresponding to one or more states and one or more actions, wherein each expert is a neural network;
        generating, by each of multiple experts using soft actor critic (SAC), a prediction based on an input, each expert output related to one or more prediction parameters corresponding to one or more actions;
        obtaining a weighted sum of the expert outputs by the multiple experts, in accordance with weights generated by the gating network for the experts, in which each expert has a corresponding weight obtained from the gating network; and generating a prediction output based on the weighted sum, wherein a training process comprises:

regarding each action as a task;

adding an entropy-regularized term to a policy function; and learning policy parameters by minimizing a Kullback-Leibler divergence between the policy function and a quotient obtained by dividing an exponential of a soft-Q function and a partition function.

8. The system of claim 7 wherein converting features from one or more data sources into embeddings comprises the steps of:

dividing the features into categorical features and numerical features; and defining a universal dynamic feature embedding dictionary to map or project the features into a unified embedding space for the embedding.

9. The system of claim 8 wherein defining a universal dynamic feature embedding dictionary to map or project input features into a unified embedding space comprises the steps of:

using a one-hot or multi-hot vector for each embedding lookup for categorical features; and transforming, using a transformation weight matrix, the categorical features from sparse features to dense features.

10. The system of claim 7 wherein the non-transitory computer-readable medium or media further comprises one or more sets of instructions which, when executed by at least one of the one or more processors, causes steps of training to be performed comprising:

implementing a soft policy iteration by repeating soft policy evaluation and soft policy improvement alternately; and training soft-Q function parameters by minimizing a soft Bellman residual.

11. The system of claim 10 wherein during the soft policy iteration, a Q-function with a minimum Q-value among multiple Q-functions is taken for each policy improvement step.

12. A non-transitory computer-readable medium or media comprising one or more sequences of instructions which, when executed by at least one processor, causes steps for multi-objective ranking comprising:

converting features from one or more data sources into embeddings;

receiving, at a multi-gate mixture of experts (MMoE) layer comprising multiple experts and a gating network, the embeddings corresponding to one or more states and one or more actions, wherein each expert is a neural network;

generating, by each of multiple experts using soft actor critic (SAC), a prediction based on an input, each expert output related to one or more prediction parameters corresponding to one or more actions;

obtaining a weighted sum of the expert outputs by the multiple experts, in accordance with weights generated by the gating network for the experts, in which each expert has a corresponding weight obtained from the gating network; and generating a prediction output based on the weighted sum, wherein a training process comprises:

regarding each action as a task;

adding an entropy-regularized term to a policy function; and learning policy parameters by minimizing a Kullback-Leibler divergence between the policy function and a quotient obtained by dividing an exponential of a soft-Q function and a partition function.

13. The non-transitory computer-readable medium or media of claim 12 wherein converting features from one or more data sources into embeddings comprises steps of:

dividing a plurality of features for one or more states and the one or more actions into categorical features and numerical features; and defining a universal dynamic feature embedding dictionary to map or project the plurality of features into a unified embedding space for the embedding.

14. The non-transitory computer-readable medium or media of claim 13 wherein defining a universal dynamic feature embedding dictionary to map or project input features into a unified embedding space comprises the steps of:

using a one-hot or multi-hot vector for each embedding lookup for categorical features; and transforming, using a transformation weight matrix, the categorical features from sparse features to dense features.

15. The non-transitory computer-readable medium or media of claim 12 wherein during the training process, loss calculation for each of the one of more actions is independent from each other.

16. The non-transitory computer-readable medium or media of claim 12 further comprises one or more sets of instructions which, when executed by at least one of the one or more processors, causes steps of training each expert to be performed comprising:

implementing a soft policy iteration by repeating soft policy evaluation and soft policy improvement alternately; and training soft-Q function parameters by minimizing a soft Bellman residual.

17. The non-transitory computer-readable medium or media of claim 16 wherein during the soft policy iteration, a Q-function with a minimum Q-value among multiple Q-functions is taken for each policy improvement step.

* * * * *